United States Patent
Fox et al.

(10) Patent No.: US 11,294,967 B2
(45) Date of Patent: Apr. 5, 2022

(54) NAVIGATION PATH METADATA SENTIMENT AWARENESS

(71) Applicant: INTERNATIONAL BUSINESS MACHINES CORPORATION, Armonk, NY (US)

(72) Inventors: Jeremy R. Fox, Georgetown, TX (US); Trudy L. Hewitt, Cary, NC (US); John Rice, Waterford (IE); Liam S. Harpur, Skerries (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 326 days.

(21) Appl. No.: 16/149,494

(22) Filed: Oct. 2, 2018

(65) Prior Publication Data
US 2020/0104417 A1    Apr. 2, 2020

(51) Int. Cl.
*G06F 16/95*      (2019.01)
*G06F 40/30*      (2020.01)
*G06F 16/951*    (2019.01)
*G06F 16/958*    (2019.01)

(52) U.S. Cl.
CPC .......... *G06F 16/951* (2019.01); *G06F 16/958* (2019.01); *G06F 40/30* (2020.01)

(58) Field of Classification Search
None
See application file for complete search history.

(56) References Cited

U.S. PATENT DOCUMENTS

| 9,336,268 | B1* | 5/2016 | Moudy | G06F 16/24578 |
| 2008/0046218 | A1* | 2/2008 | Dontcheva | G06F 11/32 |
| | | | | 702/186 |
| 2008/0244438 | A1 | 10/2008 | Peters et al. | |
| 2012/0130196 | A1 | 5/2012 | Jain et al. | |
| 2013/0132851 | A1* | 5/2013 | Konopniki | G06F 16/9535 |
| | | | | 715/736 |
| 2014/0377727 | A1* | 12/2014 | Yom-Tov | G16Z 99/00 |
| | | | | 434/236 |

(Continued)

FOREIGN PATENT DOCUMENTS

| CN | 105874446 A | 8/2016 |
| CN | 107480614 A | 12/2017 |

OTHER PUBLICATIONS

"Watson Tone Analyzer," [online] IBM Corporation [retrieved Oct. 2, 2018], retrieved from the Internet: <https://www.ibm.com/watson/services/tone-analyzer/>, 7 pg.

*Primary Examiner* — Yu Zhao
(74) *Attorney, Agent, or Firm* — Cuenot, Forsythe & Kim, LLC (57) ABSTRACT

Determining a sentiment associated with a navigation path includes determining a cumulative sentiment score indicative of sentiment of web-based content previously viewed by a user; and iteratively performing: a) analyzing a sentiment of a next web-based content navigated to by the user to determine a content sentiment score; b) determining whether the cumulative sentiment score is different than the content sentiment score; c) notifying the user when the cumulative sentiment score is different than the content sentiment score; and d) updating the cumulative sentiment score based on the content sentiment score.

20 Claims, 4 Drawing Sheets

(56) References Cited

U.S. PATENT DOCUMENTS

| | | | |
|---|---|---|---|
| 2015/0242391 A1* | 8/2015 | Goel | G06F 40/30 704/9 |
| 2016/0072903 A1* | 3/2016 | Chakra | G06F 16/337 704/9 |
| 2016/0232131 A1* | 8/2016 | Liu | G06Q 10/06 |
| 2017/0235830 A1* | 8/2017 | Smith | G06F 40/30 707/748 |
| 2018/0060338 A1* | 3/2018 | DeLuca | G06F 16/9535 |
| 2018/0196882 A1* | 7/2018 | Abou Mahmoud | G06F 16/9535 |
| 2018/0225874 A1* | 8/2018 | Page | G06F 1/163 |

* cited by examiner

NAVIGATION PATH METADATA SENTIMENT AWARENESS

BACKGROUND

The present invention relates to navigating web content, and more specifically, to sentiment analysis of the content being navigated.

Generally speaking, sentiment analysis aims to determine the attitude of a speaker, writer, or other subject with respect to some topic or the overall contextual polarity or emotional reaction to a document, interaction, or event. The attitude may be a judgment or evaluation, affective (or emotional) state of the author or speaker, or the intended emotional communication (that is to say, the emotional effect intended by the author). Web-based content for users to send or consume content varying in sentiment. Sentiment analysis of such content can provide feedback to a user.

SUMMARY

A computer-implemented method includes: determining, by a computer, a cumulative sentiment score indicative of sentiment of web-based content previously viewed by a user; and iteratively performing, by the computer a) analyzing a sentiment of a next web-based content navigated to by the user to determine a content sentiment score; b) determining whether the cumulative sentiment score is different than the content sentiment score; c) notifying the user when the cumulative sentiment score is different than the content sentiment score; and d) updating the cumulative sentiment score based on the content sentiment score.

A system includes a processor programmed to initiate executable operations. In particular the executable operations include determining a cumulative sentiment score indicative of sentiment of web-based content previously viewed by a user; and iteratively performing: a) analyzing a sentiment of a next web-based content navigated to by the user to determine a content sentiment score; b) determining whether the cumulative sentiment score is different than the content sentiment score; c) notifying the user when the cumulative sentiment score is different than the content sentiment score; and d) updating the cumulative sentiment score based on the content sentiment score.

A computer program product includes a computer readable storage medium having program code stored thereon. In particular, the program code is executable by a data processing system to initiate operations including: determining a cumulative sentiment score indicative of sentiment of web-based content previously viewed by a user; and iteratively performing: a) analyzing a sentiment of a next web-based content navigated to by the user to determine a content sentiment score; b) determining whether the cumulative sentiment score is different than the content sentiment score; c) notifying the user when the cumulative sentiment score is different than the content sentiment score; and d) updating the cumulative sentiment score based on the content sentiment score.

DETAILED DESCRIPTION

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being). The terms "employee" and "agent" are used herein interchangeably with the term "user".

When navigating digital web content, a user can easily visit different sites with various agendas, either hidden or obvious. One site may be about physics, one about political/politics, one may be satirical, and another site may be related to the user's employment. As an example, a website describes in formal language an article on "quantum entanglement" and the associated comments are of a formal nature as well. The thoughts/behavior in the user's mind might have an associated residual effect based on any other websites recently visited. Thus, based on the content of the previous 3 or 4 websites visit, the user may use that residual effect when posting a comment, even though the user's comment might not be appropriate for the other users reading or posting commentary.

Currently, users' navigation and past history path prior to reaching a site may not matter within web searching today. But users may form certain opinions and be unknowingly jaded without being aware of such a state of mind.

In accordance with the principles of the present disclosure, a system monitors a user prior to visiting a website that allows the user to read or submit comments (e.g., Thread1). In embodiments, the system has already monitored that the user has viewed several other blogs/articles/threads via the recorded navigational path, including capturing metadata for each site visited, that might result in a residual effect such as a weary, fatigued, jaded, hostile, angry, discouraged, etc. opinion on the mood/sentiment of the user, when the user reads the currently viewed content Thread 1.

Examples of types of metadata that could be captured and stored for each step of the navigation path could include, for example, sentiment of the user and/or sentiment of the website whether it be for the website content, comments on the website, or both. In accordance with the principles of the present disclosure, the system alerts the user of unexpected bias they might have. For example, the system may inform the user that "you have recently read a threshold amount of sarcastic content . . . for that reason do not assume comment 34 is sarcastic because that is the actual communication technique of that author."

Embodiments provide a social collaboration awareness vehicle to the user that enables this feature during content review and browsing and enables a user reading content to be made aware that their historic viewing could have an effect on their present sentiment. A user can misunderstand the background or frame of reference within an author's content if they mistake the contextual reference of the digital content Generally speaking, sentiment analysis aims to determine the attitude of a speaker, writer, or other subject with respect to some topic or the overall contextual polarity or emotional reaction to a document, interaction, or event. The attitude may be a judgment or evaluation, affective (or emotional) state of the author or speaker, or the intended emotional communication (that is to say, the emotional effect intended by the author). Existing approaches to sentiment analysis can be grouped into three main categories: knowledge-based techniques, statistical methods, and hybrid approaches. Knowledge-based techniques classify text by affect categories based on the presence of unambiguous affect words such as happy, sad, afraid, and bored. Some knowledge bases not only list obvious affect words, but also assign arbitrary words a probable "affinity" to particular emotions. Statistical methods leverage on elements from machine learning such as latent semantic analysis, support vector machines, "bag of words" and "Semantic Orientation—Pointwise Mutual Information". More sophisticated methods try to detect the holder of a sentiment (i.e., the person who maintains that affective state) and the target (i.e., the entity about which the affect is felt). To mine the opinion in context and get the feature about which the speaker has opined, the grammatical relationships of words are used. Grammatical dependency relations are obtained by deep parsing of the text. Hybrid approaches leverage on both machine learning and elements from knowledge representation such as ontologies and semantic networks in order to detect semantics that are expressed in a subtle manner, e.g., through the analysis of concepts that do not explicitly convey relevant information, but which are implicitly linked to other concepts that do so.

In some embodiments described herein, a client-side application in conjunction with, or incorporated within, a web browser performs sentiment analysis when a user visits a website to determine what type or types of sentiment describe the website. Such analysis can be performed on the content of the website, contents of a web page being currently viewed, and individual items of content such as users' comments on the website. As one of ordinary skill will recognize, more than one sentiment may be detected for a single content item, web page or website. Thus, in embodiments, each detected sentiment is assigned a confidence score and then combined to determine a consensus for what sentiment is present in a particular item of content. Additionally, in some embodiments, an overall sentiment for a thread of comments, for example, may be determined by the client-side application while in other embodiments, the sentiment for each comment is determined. In cases where the sentiment of each comment is determined, the client-side application can determine a sentiment associated with a particular user based on the comments posted by that user in the present thread or previously visited threads (e.g., userX frequently posts comments that are sarcastic.)

In addition to, or as an alternative to, a client side application, a server-side system, in some embodiments, visits or crawls numerous website and performs similar sentiment analysis as described above. The server-side system collects and stores the sentiment analysis associated with different websites and webpages. When a user visits a website or webpage, their browser can request the associated sentiment information from the server-side system. Alternatively, in some embodiments, the server-side system provides the sentiment information to the website as a service so that it can be embedded within one or more web pages on a website. Use of the server-side system is beneficial with websites that provide generally static content.

Figure 1:
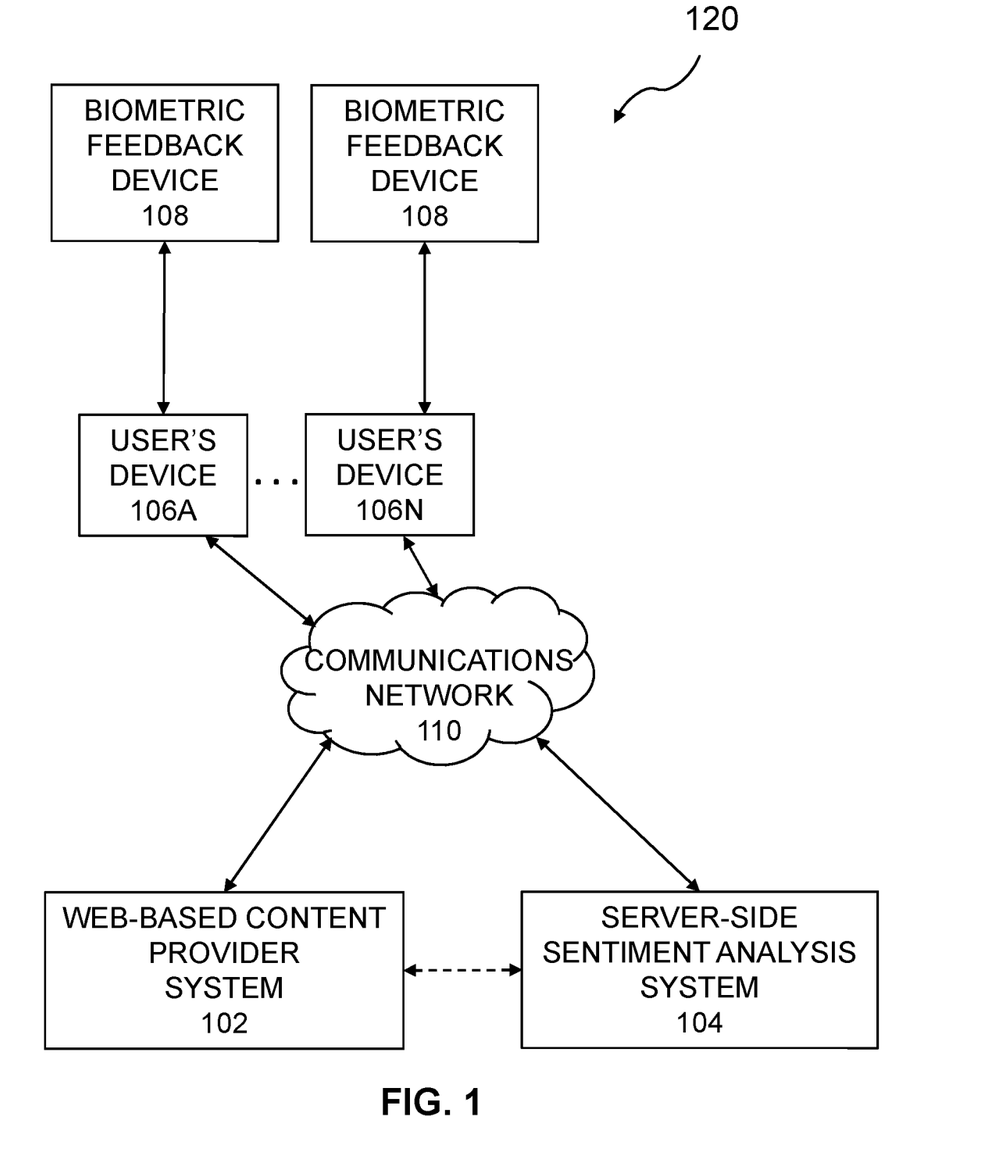
FIG. 1 illustrates a distributed computer-based system in accordance with the principles of the present disclosure.

FIG. 1 is a block diagram illustrating an example of a network data processing system 120 that includes a communication network 110. The communication network 110 is the medium used to provide communications links between various devices and data processing systems connected together within the computing environment (or network data processing system, etc.) 120. The communication network 110 may include connections, such as wire, wireless communication links, or fiber optic cables. The communication network 110 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies A web content provider system 102 allows users to consume content and, in social collaboration systems, allows users to send and receive messages (i.e., interact with one another) utilizing user devices 106A-106N. The web content provider system 102 can be a wide variety of diverse websites and can, for example, include social networks for individuals and organizations (e.g., FACEBOOK, TWITTER, WHATSAPP, WECHAT, etc.), texts and instant messaging, e-mails, word processing applications, forums, web sites, blogs, web pages for reviews and comments, social collaboration platforms (e.g., GITHUB) or social collaboration services that focus on the identification of groups and collaboration spaces in which messages are explicitly directed at the group and the group activity feed is seen the same way by everyone.

As described below with FIG. 2, in some embodiments, the sentiment analysis system is executing on a user device 106A-106N. However, FIG. 1 also depicts embodiments in which there is a server-side sentiment analysis system 104. As discussed below, in some embodiments, a biometric feedback device 108 can be in communication with the one of the user devices 106A-106N to collect real-time biometric and physiological data that is indicative of the sentiment of the user. From the user's perspective, the physiological and biometric data can be used as additional inputs for determining how the sentiment of the web-based content being viewed is being perceived by the user. In some embodiments, the sentiment analysis system collects biofeedback data and sentiment analysis data about the web based content that the user is currently viewing so that, for example, the sentiment analysis system can compare an expected user sentiment state with the actual user sentiment state. The use of biofeedback data is provided by way of example only. Heart rate, respiration rate, eye movement, eye dilation, blood pressure, voice intensity, voice volume, facial expressions are examples of biofeedback data that may be helpful in determining a user's current sentiment state. In addition, any comments that a user might be posting to a website can be analyzed by the sentiment analysis system to aid in determining the current sentiment state of the user.

Figure 2:
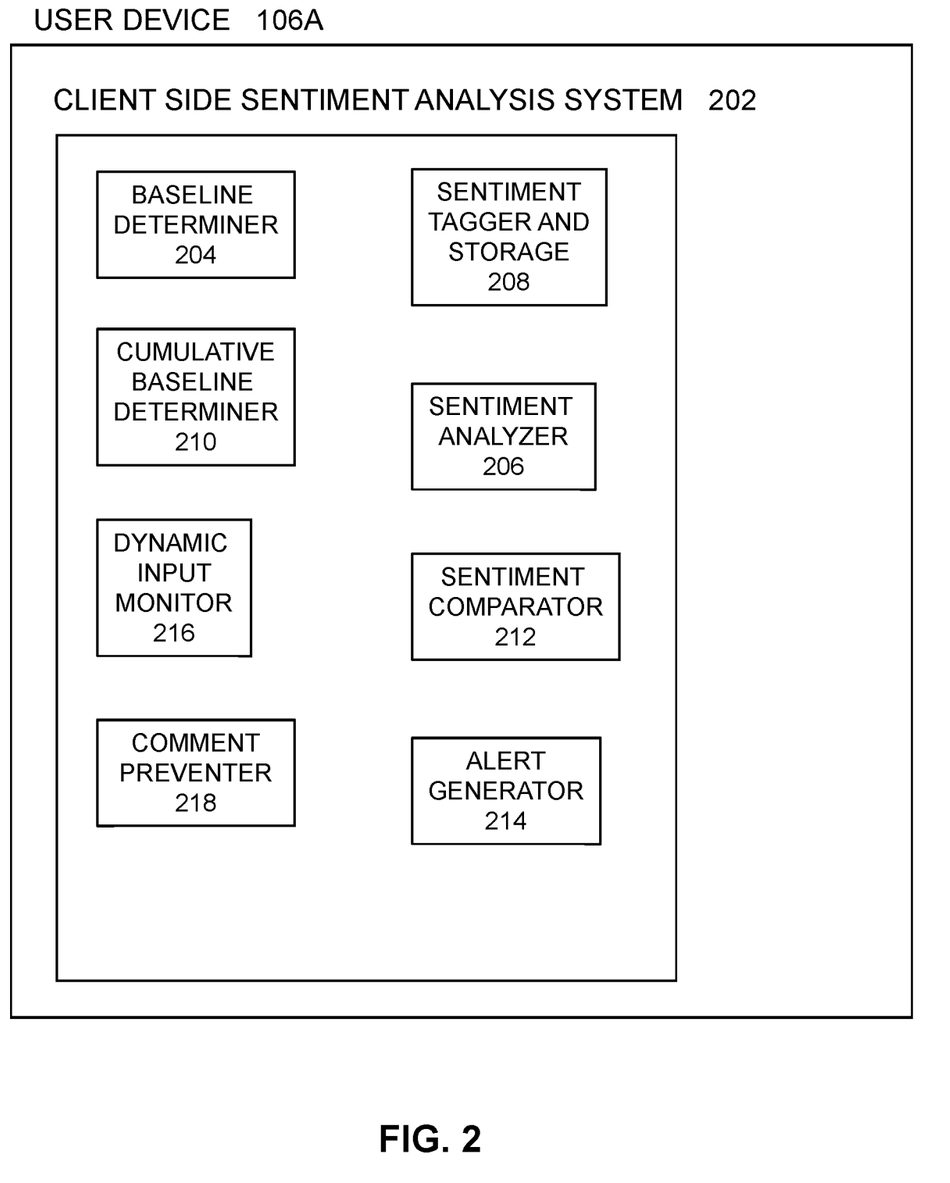
FIG. 2 illustrates depicts a functional block diagram of a sentiment analysis system in accordance with the principles of the present disclosure.

FIG. 2 depicts a block-level diagram of example functionality modules or software applications of a sentiment analysis system in accordance with the principles of the present disclosure. FIG. 2 happens to depict a client-side sentiment analysis system 202 that is executing on a user device 106A. In some embodiments, some or all of the same functionality is also provided in a server-side sentiment analysis system 104 of FIG. 1.

The functionality of each of the blocks in FIG. 2 are described briefly below. However, a more detailed description along with examples are provided in the description of FIG. 3. As mentioned above, the a client side sentiment analysis system 202 is executing on a user device (e.g., 106A), in some embodiments. The sentiment analysis system 202 may be integrated within a web browser or operate in conjunction with the web browser. Initially, a baseline sentiment determiner 204 calculates a baseline sentiment value of a user as the the user begins navigating to web-based content. The baseline sentiment value provides a starting point to track the sentiment of the user during a web browsing period. The web browsing period may be reset if the user is inactive for a predetermined period of time, it may be reset when the user exits the browser or it may be reset based on other criteria. Once the baseline sentiment value is determined, the user may navigate to web-based content. A sentiment analyzer 206 calculates a content sentiment score for that content. One of ordinary skill will recognize that many different methods of calculating the sentiment of the web-based content can be used without departing from the scope of the present disclosure. In some embodiments, the sentiment analyzer 206 will search a stored log for the web-based content being viewed and retrieve a previously calculated content sentiment score.

Working in conjunction with the sentiment analyzer 206, a sentiment tagger and storage component 208 maintains a history of the user's navigation through web-based content. The web-based content can be, for example, one of a website, a web page, or individual content items on the web page (e.g. a user's comment in a thread). The URL of the content, or some other data that identifies the web-based content, is stored along with other metadata. The other metadata includes the content sentiment score that was calculated about that web-based content. In at least some embodiments, each web-based item navigated to will have its own entry stored by the sentiment tagger and storage component 208 in chronological order. Thus, a historical navigation path of the user is maintained along with a sentiment pattern associated with that navigation path.

The content sentiment value associated with each content item navigated to by the user is used to adjust the baseline sentiment value. In other words, a cumulative baseline determiner 210 adjusts the initial baseline sentiment value based on the next web content navigated to be the user to arrive at a cumulative baseline sentiment value. Then, as each successive web-based content is navigated to, the content sentiment value for that content is used to adjust the cumulative baseline sentiment value which is referred to herein as a "cumulative baseline mood or sentiment value". This reflects an iteratively updated value indicative of the sentiment of the previously visited content in the navigation path of the user.

The sentiment comparator 212 compares the content sentiment value of the web based content the user just navigated to with the cumulative baseline mood or sentiment value. When the two values are different, an alert generator 214 notifies the user of this occurrence. A difference in the two values is indicative of the current web-based content having a different sentiment than the accumulation of sentiments from previously visited web-based content. For example, if the user had been navigating relative positive sentiment content and then navigates to a sarcastic comment, the alert generator 214 may, in additional to simply noting the difference in the two sentiment values, inform the user that the context of the comment is sarcasm in order to allow the user to consider that when interpreting the comment. In some embodiments, the alert generator 214 notifies the user of the content sentiment value and the cumulative baseline mood or sentiment value.

In some embodiments the client-side sentiment analysis system 202 includes a dynamic input monitor 216 that monitors a user when typing a comment to post or send to a web site or social collaboration network so that the sentiment analyzer 206 is able to determine a message sentiment value for the comment. The monitoring may occur while the comment is being composed or may be determined, after composition, when the user tries to post or send the comment. The sentiment comparator 212 then compares the message sentiment value to the cumulative baseline mood or sentiment value to determine if the two values are different. Either the alert generator 214 can notify the user of the difference in the two values or a comment preventer component 218 can prevent the comment from being sent until it is edited to match a particular sentiment.

Figure 3:
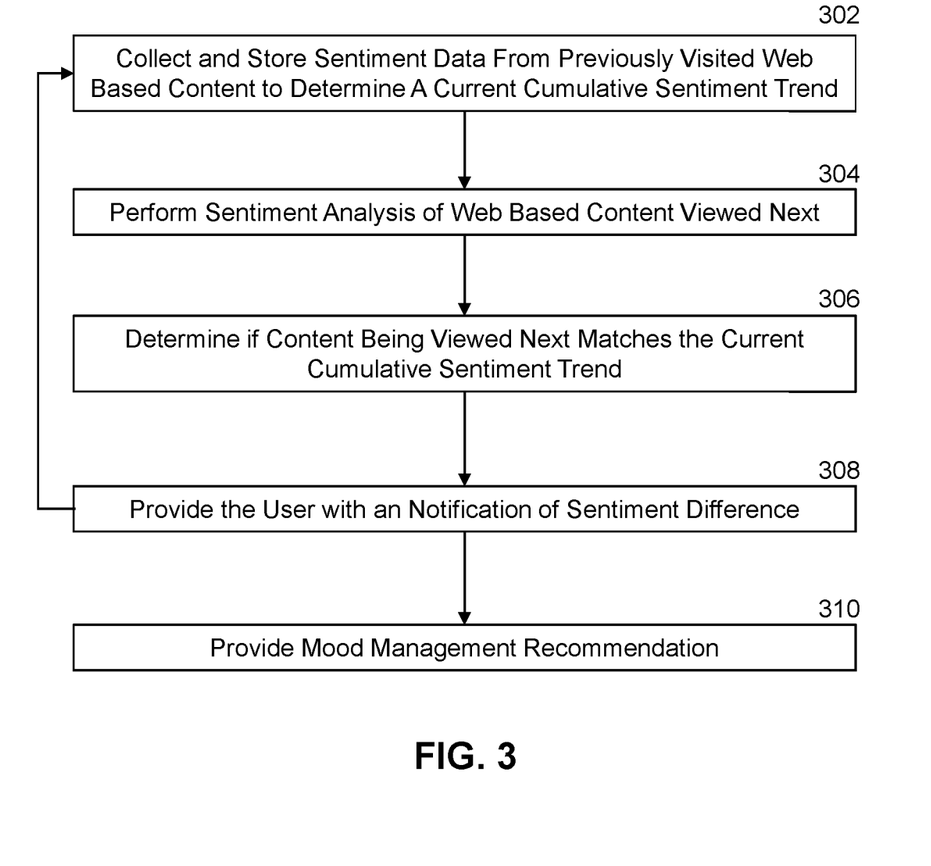
FIG. 3 is a flowchart of an example method of performing navigation path sentiment analysis in accordance with the principles of the present disclosure.

FIG. 3 is a flowchart of an example method for determining a sentiment associated with a navigation path in accordance with the principles of the present disclosure. In step 302, sentiment data is collected as a user visits various content items, websites and web pages. In some embodiments, the sentiment data is collected and stored by a client-side sentiment analysis system, in other embodiments, a server-side sentiment analysis system collects the sentiment analysis data, and yet in other embodiments, both client-side and server-side sentiment analysis systems can collect the sentiment analysis data.

As described above, the sentiment analysis system analyzes each web page or website visited to determine a sentiment associated with one or more web-based content items on the web page or website. The sentiment analysis system also stores that sentiment analysis result as meta-data that is associated with a particular web site or web page. The sentiment analysis data collected for an item of web-based content can include timestamp information that allows the sentiment analysis system to determine an order in which the different content items were visited and how long a user stayed on a particular web page or content item.

As mentioned, in some embodiments, the sentiment analysis system includes a baseline sentiment value for various paths of content. For example, historical sentiment analysis data can be collected from multiple users when such users read contentA, contentB and contentC in that order. Based on the historical data, it is expected that a new user who reads that same content would have a present sentiment state based on the respective sentiment associated with each of contentA, contentB, and contentC. In other embodiments, biofeedback information can be collected for a particular user as they are being exposed to content in a particular order. Thus, a more personalized baseline can be constructed. A respective baseline can be determined for each of a number of different sentiment patterns of content.

Assuming, the user has a sentiment navigation path, for the last three visited sites, that matches the sentiment pattern of contentA, contentB, and contentC. The user's current sentiment state is assumed to match the baseline discussed above. Next, the sentiment analysis system generates a mood value for a web-based content item based on a combination of a defined index. One example "tone analyzer" detects 5 different tones within the text of an item and assigns an associated degree of confidence so as to define a vector indicative of the sentiments of the item.

As a user navigates within or between different sites, the sentiment analysis system utilizes conventional sentiment analysis techniques to determine a measure or value of a mood of each piece of digital content the user is viewing such as an article, blog, comment, or website, for example. Typically, a mood value for an individual content item is a mathematically derived value that is indicative of the types and amounts of different sentiments in the content item. In some embodiments, a mood value may also be ascertained by listening, observing, or otherwise measuring the user. For each content item being viewed, the sentiment analysis system determines a sentiment value or tag and changes the baseline mood value based on the sentiment value of the currently viewed item. This process repeats for each viewed content item as the user navigates within a web page or website and/or as the user navigates between web pages or web sites. Thus, the baseline mood value for the user is updated so as to create a cumulative baseline mood or sentiment value.

A web page, for example, can include a headline, a main article and a comments section. The sentiment analysis system may determine that the headline is inflammatory, the main article is neutral, and the comments section is very negative. A user who concentrates on the main article will likely have a different behavioral reaction that a user who concentrates on the headline and comments section. Thus, in accordance with some embodiments, the sentiment analysis system collects sentiment metadata about which content items on the web page were the focus of the user and relative time periods that the user spent viewing each content item. Thus, the sentiment score that the sentiment analysis system determines for the web page can be different for each user depending on the manner in which each user navigated through the web page. Accordingly, the resulting adjustment to a user's cumulative baseline mood or sentiment value will differ as well.

In some embodiments, the sentiment analysis system determines the sentiment of a comment being created by the user. For example, as the user is entering the text of a comment, the sentiment analysis system monitors the text to determine a sentiment value for the potential comment. The sentiment analysis system can dynamically monitor the text as it is being typed or allow the comment to be fully entered and then analyze the potential comment before "sending" or "posting" the content. The sentiment analysis system can alert the user if the sentiment of the potential comment is different than the cumulative baseline mood or sentiment value.

Next, in step 304, the sentiment analysis system determines a sentiment value of the next content that the user navigates to so that the sentiment analysis system can compare, in step 306, the cumulative baseline mood or sentiment value of the user with the sentiment value of the next content item to be viewed.

Based on whether or not the sentiment or mood of the next content item matches that of the cumulative baseline mood or sentiment value for the user, the sentiment analysis system, in step 308, alerts the user that a deviation from what was expected occurs. Thus, the sentiment analysis system detects when a content item that the user navigates to has a different sentiment than the sentiment trend defined by the cumulative baseline mood or sentiment value for that user.

When this occurs, the sentiment analysis system can alert the user that the context of the content may be different than the user was expecting. One of ordinary skill will recognize that such an alert can be provided in a variety of different ways such as audible, visual, pop-up windows, etc. In some embodiments, the notification or alert provided to the user includes information helpful in recognizing the context of the web-based content. For example, the user may have navigated through relatively negative content items recently and thus their cumulative baseline mood or sentiment value will likely be more negative than positive. If the next content item they navigate to is positive, the user (because of the residual effects of the past content) may view that content as sarcasm rather than in the positive manner it was intended. By notifying the user that their cumulative baseline mood or sentiment value is "negative" and that the navigated-to content is "positive", the user is provided information that assists them in understanding the context of the content as well as assists them in correctly interpreting an intended meaning of the content.

At step 308, control of the flowchart can continue with step 310 (discussed below) and can return to step 302 such that the cumulative baseline sentiment of mood value can be updated with the sentiment of the web-based content just viewed. In this manner, a running cumulative baseline value is maintained.

One of ordinary skill will recognize that whether or not the sentiment or mood of the next content item matches that of the cumulative baseline mood or sentiment value for the user is functionally equivalent to determining whether or not the two values differ from one another as well. Furthermore, the term "matches" does not mean that there is necessarily an identical equality of the two values, even though in some instance that may occur. Rather, a predetermined threshold, margin or variance can be set such that if the two values are sufficiently similar to one another within that predetermined margin, then the two values are considered to match one another.

As an example, a user with a cumulative baseline mood or sentiment value indicating a positive mood visits Site_1 which the sentiment analysis system analyzes and determines the site's sentiment is generally negative. The user's cumulative baseline mood or sentiment value is updated such that now the cumulative baseline mood or sentiment value indicates a negative mood for the user.

The user, now with a cumulative baseline mood or sentiment value indicative of a negative mood, then visits Site_2, with content that the sentiment analysis system determines generally as sarcastic. While at Site_2, the user authors a comment that the sentiment analysis system determines is negative. The sentiment analysis system concludes this result is what was expected based on the cumulative baseline mood or sentiment value of the user. The sentiment analysis system will not interfere with posting of the comment. Additionally, the because the sentiment of the content of Site_2 aligns with the cumulative baseline mood or sentiment value of the user, Site_2 appears to match the navigation trend or pattern of the user.

Still with a cumulative baseline mood or sentiment value indicative of a negative mood, the user still at Site_2 navigates to a next content item and reads a comment which the sentiment analysis system determines is positive. The sentiment analysis system determines that the cumulative baseline mood or sentiment value of the user is negative rather than positive. This occurrence causes the sentiment analysis system to alert the user that the context of the comment may not be what was expected.

In the above examples, sentiments of "positive" vs. "negative" are used but other contrasting sentiments may include "engaged" vs "disengaged" or "pleasant" vs. "unpleasant". Sentiments such as tense, nervous, stressed, upset, sad, depressed, bored, fatigued, calm, relaxed, serene, contented, happy, elated, excited, alert are example sentiments that can be present in varying degrees in a content item. The sentiment analysis system, in accordance with embodiments of the present disclosure, can generate a score or value for a content item based on a combination of the different sentiments and use that score to maintain a cumulative baseline mood or sentiment value for a user that reflects the navigation path the user has taken through web-based content. For example, the cumulative baseline mood or sentiment value may be simply an average of the individual content sentiment values calculated for each web-based content item navigated to by the user.

In at least some embodiments, the sentiment analysis system includes functionality, in step 310, to dynamically change or control the content being viewed or consumed by the user. For example, if the user has read 4 successive and consecutive "angry" pages, the user likely has a cumulative baseline sentiment or mood value indicative of a highly negative mood, the sentiment analysis system may prevent that user from participating an instant communication exchange with a loved one or a close friend via a social network, for a predetermined time period. Alternatively the sentiment analysis system can suggest or provide content with a specific sentiment value in an attempt to change the cumulative baseline sentiment or mood value in a particular direction. An artificial intelligence system that is part of the sentiment analysis system can be trained for a user so as to learn that certain types of content produce a "positive" outcome when the user's current cumulative baseline mood or sentiment value is present. The sentiment analysis system can use that knowledge to limit or control what content can be navigated to by the user. Based on the stored navigation path and metadata, the sentiment analysis system is able to identify content items having the desired sentiment characteristics.

Figure 4:
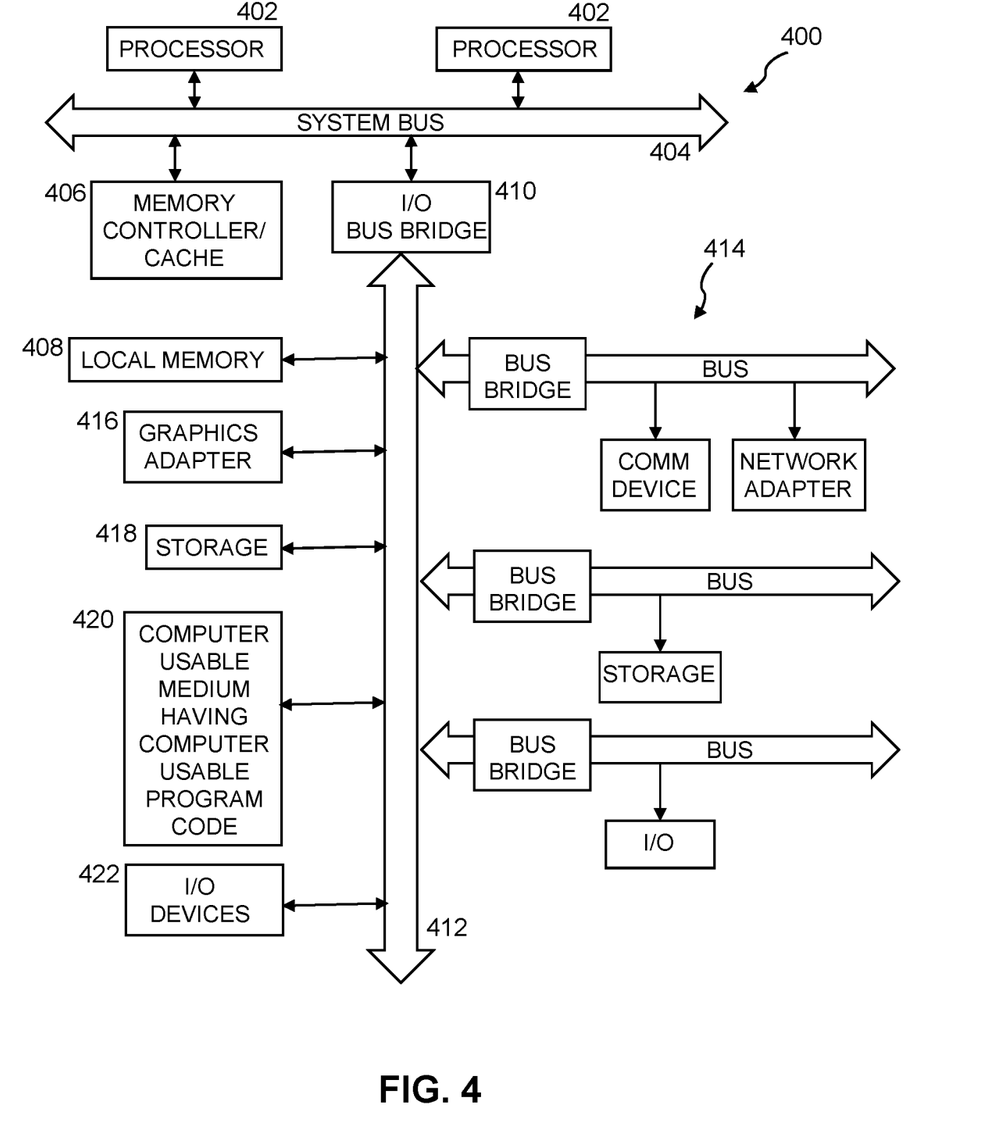
FIG. 4 depicts a block diagram of a data processing system in accordance with the present disclosure.

Referring to FIG. 4, a block diagram of a data processing system is depicted in accordance with the present disclosure. A data processing system 400, such as may be utilized to implement either of the sentiment analysis system 104, 202 or aspects thereof, e.g., as set out in greater detail in FIG. 1-FIG. 3, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more buses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspect of any of the methods, computer program products and/or system components illustrated in FIG. 1-FIG. 3. It should be appreciated that the data processing system 400 can be implemented in the form of any system including a processor and memory that is capable of performing the functions and/or operations described within this specification. For example, the data processing system 400 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The data processing system 400, such as may also be utilized to implement either of the sentiment analysis systems 104, 202, or aspects thereof, e.g., as set out in greater detail in FIG. 1-FIG. 3.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method within and by a computer having a browser, comprising:
    automatically resetting a prior cumulative sentiment score to a baseline cumulative sentiment score upon the browser being inactive for a predetermined period of time;
    iteratively adjusting the baseline cumulative sentiment score to generate a cumulative sentiment score indicative of sentiment of web-based content previously viewed by a user by iteratively performing for each instance of web-based content being navigated to by the user:
        detecting, by the browser, a next web-based content being navigated to by the browser;
        automatically analyzing, responsive to the detecting, a sentiment of the next web-based content being navigated to by the browser to determine a content sentiment score;
        presenting, using the browser and to the user, the next web-based content and a notification indicative of the cumulative sentiment score being different than the content sentiment score; and
        automatically updating the cumulative sentiment score based on the content sentiment score;
    controlling access, using the browser, to particular web-based content based upon the cumulative sentiment score;
    real-time monitoring, by the computer, a message being composed by the user within the browser;
    determining, by the computer, a message sentiment score indicative of a sentiment of the message being composed;
    notifying, by the computer, the user when the message sentiment score is different than the cumulative sentiment score; and
    preventing, by the computer, the user from sending the message until the message is edited to have a new message sentiment score that matches a particular sentiment.

2. The method of claim 1, wherein:
the controlling access includes:
    determining a need to change the cumulative sentiment score, and
    identifying, using a stored navigation path and metadata of the web-based content previously viewed by the user, the particular web-based content based upon a determination that the particular web-based content can change the cumulative sentiment score.

3. The method of claim 1, wherein:
the controlling access includes preventing the user from performing a computer-implemented action.

4. The method of claim 1, further comprising:
storing, by the computer, an identity of each web-based content navigated to by the user; and
storing, by the computer, respective metadata associated with each identity, wherein
the respective metadata comprises sentiment information about the associated identity.

5. The method of claim 4, wherein
the respective metadata stores a viewing time of the user associated with each identity.

6. The method of claim 1, wherein
the controlling access includes providing access to the particular web-based content.

7. The method of claim 1, wherein
the controlling access includes preventing access to the particular web-based content.

8. The method of claim 1, wherein
determining whether the cumulative sentiment score is different than the content sentiment score comprises determining whether the cumulative sentiment score is different than the content sentiment score by more than a predetermined threshold.

9. The method of claim 1, further comprising:
preventing, by the computer, the user from navigating to additional web-based content based on the cumulative sentiment score.

10. The method of claim 1, wherein
notifying the user comprises one or more suggestions about a context of the next web based content.

11. A computer system including a browser, comprising:
a processor programmed to initiate executable operations comprising:
    automatically resetting a prior cumulative sentiment score to a baseline cumulative sentiment score upon the browser being inactive for a predetermined period of time;
    iteratively adjusting the baseline cumulative sentiment score to generate a cumulative sentiment score indicative of sentiment of web-based content previously viewed by a user by iteratively performing for each instance of web-based content being navigated to by the user:
        detecting, by the browser, a next web-based content being navigated to by the browser;
        automatically analyzing, responsive to the detecting, a sentiment of the next web-based content being navigated to by the browser to determine a content sentiment score;
        presenting, using the browser and to the user, the next web-based content and a notification indicative of the cumulative sentiment score being different than the content sentiment score; and
        automatically updating the cumulative sentiment score based on the content sentiment score;
    controlling access, using the browser, to particular web-based content based upon the cumulative sentiment score;

real-time monitoring, by the computer, a message being composed by the user within the browser;

determining, by the computer, a message sentiment score indicative of a sentiment of the message being composed;

notifying, by the computer, the user when the message sentiment score is different than the cumulative sentiment score; and preventing, by the computer, the user from sending the message until the message is edited to have a new message sentiment score that matches a particular sentiment.

12. The system of claim 11, wherein
the controlling access includes:
   determining a need to change the cumulative sentiment score, and
   identifying, using a stored navigation path and metadata of the web-based content previously viewed by the user, the particular web-based content based upon a determination that the particular web-based content can change the cumulative sentiment score.

13. The system of claim 11, wherein
the controlling access includes preventing the user from performing a computer-implemented action.

14. The system of claim 11, wherein
the processor is programmed to initiate executable operations further comprising:
   storing an identity of each web-based content navigated to by the user; and
   storing respective metadata associated with each identity, wherein
   the respective metadata comprises sentiment information about the associated identity.

15. The system of claim 14, wherein
the respective metadata stores a viewing time of the user associated with each identity.

16. The system of claim 11, wherein
the controlling access includes providing access to the particular web-based content.

17. The system of claim 11, wherein
the controlling access includes preventing access to the particular web-based content.

18. The system of claim 11, wherein
determining whether the cumulative sentiment score is different than the content sentiment score comprises determining whether the cumulative sentiment score is different than the content sentiment score by more than a predetermined threshold.

19. The system of claim 11, wherein
the processor is programmed to initiate executable operations further comprising:
preventing the user from navigating to additional web-based content based on the cumulative sentiment score.

20. A computer program product, comprising:
a computer readable storage medium having program code stored thereon, the program code executable by a data processing system including a browser to initiate operations including:
   automatically resetting a prior cumulative sentiment score to a baseline cumulative sentiment score upon the browser being inactive for a predetermined period of time;
   iteratively adjusting the baseline cumulative sentiment score to generate a cumulative sentiment score indicative of sentiment of web-based content previously viewed by a user by iteratively performing for each instance of web-based content being navigated to by the user:
      detecting, by the browser, a next web-based content being navigated to by the browser;
      automatically analyzing, responsive to the detecting, a sentiment of the next web-based content being navigated to by the browser to determine a content sentiment score;
      presenting, using the browser and to the user, the next web-based content and a notification indicative the cumulative sentiment score being different than the content sentiment score; and
      automatically updating the cumulative sentiment score based on the content sentiment score;
   controlling access, using the browser, to particular web-based content based upon the cumulative sentiment score;
   real-time monitoring, by the computer, a message being composed by the user within the browser;
   determining, by the computer, a message sentiment score indicative of a sentiment of the message being composed;
   notifying, by the computer, the user when the message sentiment score is different than the cumulative sentiment score; and
   preventing, by the computer, the user from sending the message until the message is edited to have a new message sentiment score that matches a particular sentiment.

* * * * *